Sept. 23, 1930.   G. F. WEINLAND   1,776,342
PROJECTION SCREEN
Filed April 20, 1928   2 Sheets-Sheet 1

Inventor
George F. Weinland

Sept. 23, 1930.  G. F. WEINLAND  1,776,342
PROJECTION SCREEN
Filed April 20, 1928    2 Sheets-Sheet 2
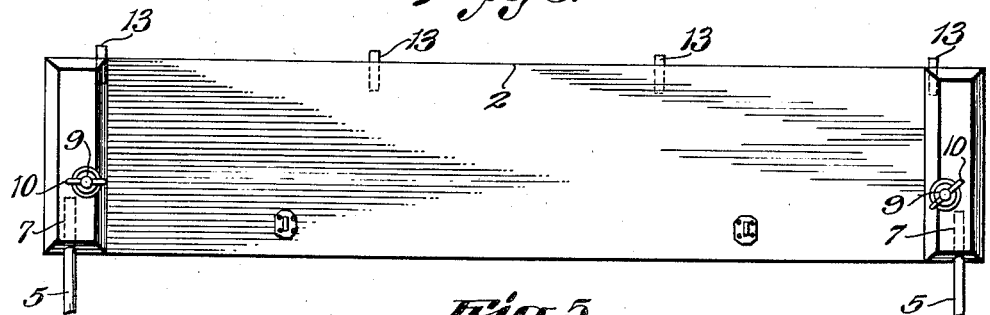
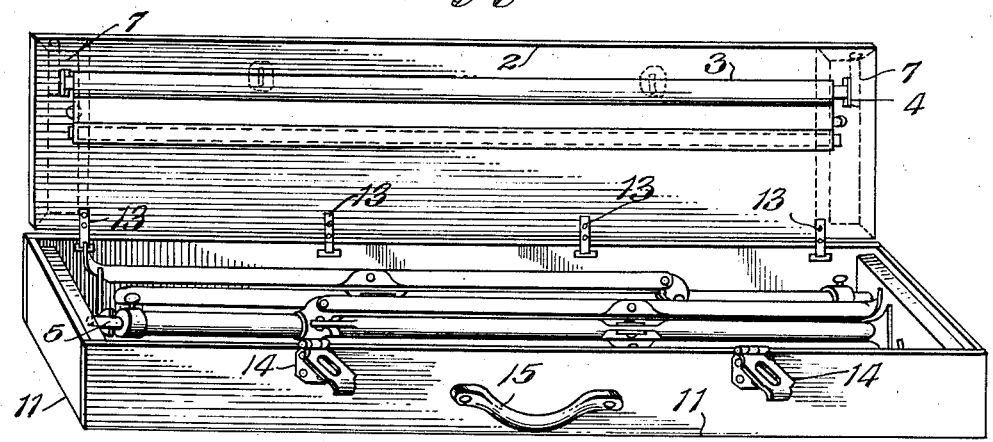
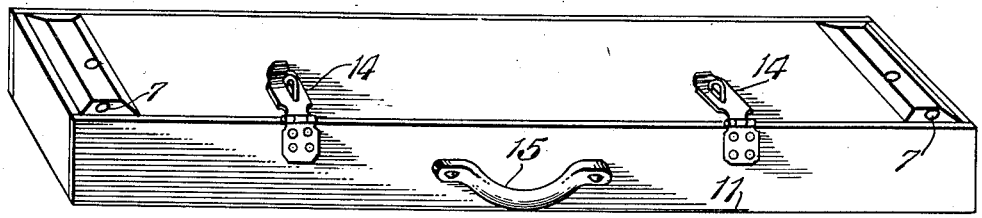
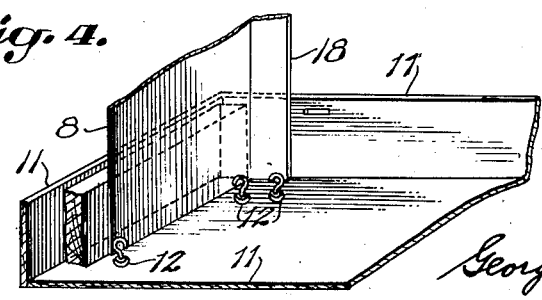
Inventor
George F. Weinland Patented Sept. 23, 1930

1,776,342

UNITED STATES PATENT OFFICE

GEORGE FERNANDO WEINLAND, OF UHRICHSVILLE, OHIO

PROJECTION SCREEN

Application filed April 20, 1928. Serial No. 271,519.

The invention relates to improvements in projection screens for the display of motion pictures or lantern slide views, and the objects of the invention are, first, to provide a folding, portable projection screen that can be used in the daylight as well as in the dark; second, to provide a screen having a minimum number of parts, and one in which all parts thereof are self contained when in an inoperative position; third, to provide means by which light from any source may be prevented from striking the face, or audience surface, of the screen from the side, above or below; fourth, to provide a screen container in which the screen and its supports can be compactly folded; fifth, to provide a screen container which becomes a part of the device when in a position for use; and other objects which will appear from the specifications and in the claims where the novel features are pointed out. This I accomplish by the means hereinafter fully described and as particularly pointed out in the claims.

Fig. 3 is a rear view of the headboard showing by what means it is held in upright position when in use.

Fig. 4 is a sectional view of the screen container when being used as part of the device.

Fig. 5 is a view of the screen container with screen and folding stands packed for storage or transportation, but with the top left open.

Fig. 6 is a view of the device all packed and closed for storage or transportation.

It is proposed to take advantage of the fact that an image projected on a screen of translucent material and of satisfactory light diffusing quality can be seen on the surface of the screen opposite to the projection apparatus. Secondly, this image can be clearly seen even in the daylight when means are provided to prevent light from the side, above or below from striking the face, or audience side, of the screen. Third, an image reflected from the surface of a screen of satisfactory reflecting quality can also be seen in daylight when means are provided to prevent light from the side, above or below from striking the face, or audience surface, of the screen.

Figure 1:
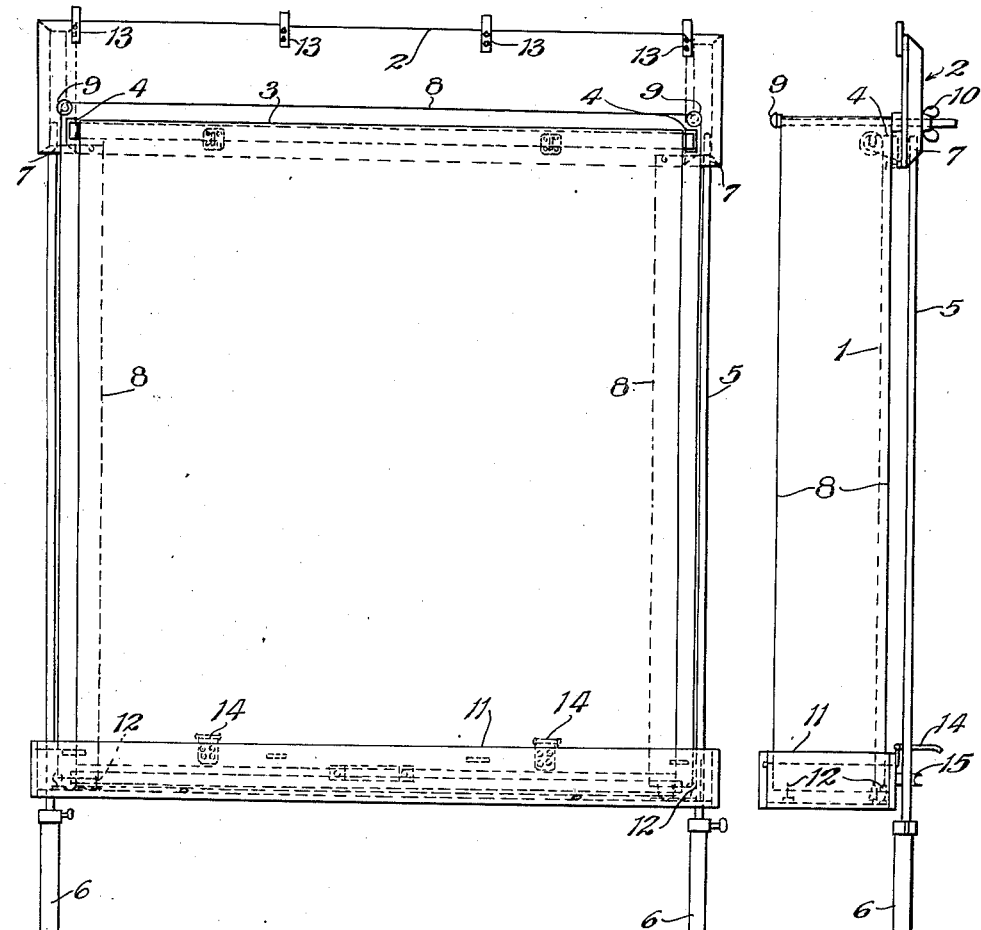
Fig. 1 is a face view of one form of screen made in accordance with my invention.
Figure 1:
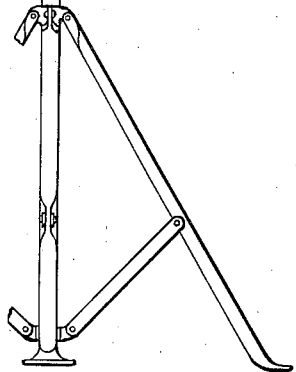

Referring to the drawings, Fig. 1 represents the face, or audience view of the screen 1 mounted on a headboard 2 by means of a spring roller 3 and brackets 4 of the ordinary type used in mounting window shades. This spring roller and brackets are of a common commercial variety and are not claimed as part of this invention. This headboard 2 is held in an upright position by the rods 5 supported by folding stands 6. These rods and stands are of a common commercial variety and are not claimed as part of this invention. The upper part of these rods 5 fit into holes 7, Fig. 3, in metal or wooden cleats of any satisfactory design fastened to the back of the headboard 2.

Figure 2:
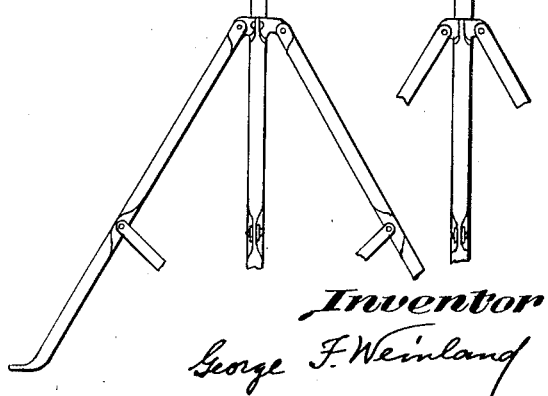
Fig. 2 is a side view of the same screen.

Fig. 2 is a side view of the device showing a strip of cloth or other light-tight material 8 held in position by being suspended from the headboard 2 by two bolts 9 set in holes in the headboard 2 and fastened by wing-nuts 10 Fig. 3.

Fig. 4 shows how the screen container is suspended from the side curtains 8 by hooks or buttons 12 and keeps the side curtains 8 in position. When set up in this position the curtain 8 running across the top and down the sides in conjunction with the screen container 11 suspended across the bottom effectually keeps light from any source from striking the face, or audience surface, of the screen from the side, above or below. This is an essential feature of the device and is designed to take advantage of the principle that an image projected on the reflecting surface of an opaque screen or through a translucent screen becomes clearly visible even in daylight when light is prevented from striking the face, or audience surface, of the screen from the side, above or below. Any other light striking the screen from the audience side is overcome by the light rays from the projector. The side of the screen away from the audience should be kept as dark as possible but by the use of this device the audience can sit in ordinary daylight thus making it very desirable for schoolroom use. No exact width for the side curtains 8 in proportion to the width of the screen is proposed but in this model a curtain seven inches wide is used with a screen three feet square. When made for some uses the curtain may need to be much wider in proportion to the screen width and for use in other surroundings the side curtains may be greatly reduced in width.

Fig. 5 shows the device packed for storage but with the top left open. No. 11 is the screen container with the stands 6 and rods 5 folded and in place, rolled screen 1 fastened to the headboard 2 which becomes the lid of the box. This lid is fastened on by metal projections 13 which fit into holes in the side of the container and hasps 14 shown in Fig. 6.

Fig. 6 shows the device packed and closed for storage or transportation.

To set up the device the container 11 is laid on the floor or across a chair with the handle 15 away from the audience. The top 2 is unlocked and set aside. The folding stands 6 with their extension rods 5 are lifted out and set up with the rods extending to an even height and the distance apart of the length of the top 2. Next the top 2 of the box which now becomes the headboard, is put in place by the holes 7 being fitted over the extension rods 5. The side curtains 8 are now attached by the bolts being put through holes in the headboard 2 and fastened by wing-nuts 10 on the back. The edges of the curtain 8 are buttoned in place on the headboard 2 and the container 11 suspended from the curtains 8 by hooks 12 on the inside of the container. The screen is rolled down from the spring roller 3 and fastened by its hooks to the container thus being held in a taut position. The device is now ready for use and the image focused on the screen by the projector from the opposite side to the audience if a translucent screen is used and from the audience side if a reflecting screen is used.

The device is simple and inexpensive, can be manufactured and marketed at a minimum cost and is highly efficient and desirable in every way, and since probably the best results may be obtained from the details disclosed they may well be followed.

It is obvious that numerous modifications can be made from the embodiment of my invention illustrated in the drawings and I contemplate as included in my invention all such modifications as fall within the terms of the appended claims.

Having thus described my invention I claim:

1. A portable projection screen structure comprising a box having a removable top, means removable from the box for supporting the top spaced from the box to provide a frame for supporting a screen, side curtains for the screen, means in the box for detachably securnig one end of each curtain to the box and detachable means for securing the other end of each curtain to the top of the box.

2. A portable projection screen structure of the character described including a box with a removable top and a curtain which is adapted to being held in an operative position, two curtain supporting bolts sceured in the removable top to the box means for supporting the top in an operative position as a headboard, and means in the box for securing the curtain running down the sides and across the top with the box suspended across the bottom from the ends of the curtain.

G. F. WEINLAND.